US007123789B2

(12) United States Patent
Gorni et al.

(10) Patent No.: US 7,123,789 B2
(45) Date of Patent: Oct. 17, 2006

(54) OPTICAL MULTI/DEMULTIPLEXER DEVICE, OPTICAL WAVELENGTH SELECTIVE FILTER AND METHOD OF MAKING FILTER

(75) Inventors: Giacomo Gorni, Pavia (IT); Maurizio Tormen, Belluno (IT); Marco Romagnoli, Milan (IT); Matteo Cherchi, Lecco (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/493,570

(22) PCT Filed: Oct. 26, 2001

(86) PCT No.: PCT/EP01/12419

§ 371 (c)(1),
(2), (4) Date: Nov. 22, 2004

(87) PCT Pub. No.: WO03/044578

PCT Pub. Date: May 30, 2003

(65) Prior Publication Data

US 2005/0069247 A1    Mar. 31, 2005

(51) Int. Cl.
*G02B 6/00* (2006.01)
*G02B 6/26* (2006.01)

(52) U.S. Cl. ............... 385/24; 385/132; 385/129; 385/131; 385/130; 385/37; 385/14; 385/45

(58) Field of Classification Search ............... None
See application file for complete search history.

(56) References Cited

U.S. PATENT DOCUMENTS 4,790,614 A * 12/1988 Imoto et al. ............... 385/130
5,457,760 A    10/1995 Mizrahi
5,818,986 A * 10/1998 Asawa et al. ............... 385/24
5,838,870 A * 11/1998 Soref ............... 385/131
5,911,019 A    6/1999 Cohen
5,978,536 A    11/1999 Brandi et al.
6,226,426 B1 * 5/2001 Magne et al. ............... 385/24
6,580,863 B1 * 6/2003 Yegnanarayanan et al. . 385/132

FOREIGN PATENT DOCUMENTS

WO    WO 01/50644 A1    7/2001

OTHER PUBLICATIONS

Loh et al.; "Novel Designs for Sampled Grating-Based Multiplexers-Demultiplexers"; Optics Letters, vol. 24, No. 21, pp. 1457-1459, (1999).
Shibata et al.; "Coupling Coefficient Modulation of Waveguide Grating Using Sampled Grating"; IEEE Photonics Technology Letters, vol. 6, No. 10, pp. 1222-1224, (1994).
Zengerle et al.; "Phase-Shifted Bragg-Grating Filters With Improved Transmission Characteristics"; Journal of Lightwave Technology, vol. 13, No. 12, pp. 2354-2358, (1995).

* cited by examiner

*Primary Examiner*—Frank G. Font
*Assistant Examiner*—Erin Chiem
(74) *Attorney, Agent, or Firm*—Finnegan, Henderson, Farabow, Garrett & Dunner, L.L.P.

(57) ABSTRACT

An optical wavelenth selective filter on an optical waveguide and a method of making the same is provided. The filter is able to transmit a first predetermined band of wavelengths and to reflect a second predetermined band. The filter further includes a plurality of transmissive couples and reflective couples in series, with each of the couples including a first zone of high refractive index and a second zone of low refractive index adjacent to each other so as to form a structure with a high gap modulated refractive index.

19 Claims, 9 Drawing Sheets

OPTICAL MULTI/DEMULTIPLEXER DEVICE, OPTICAL WAVELENGTH SELECTIVE FILTER AND METHOD OF MAKING FILTER

CROSS REFERENCE TO RELATED APPLICATIONS

This application is a national phase application based on PCT/EP01/12419, filed Oct. 26, 2001, the content of which is incorporated herein by reference.

Present invention regards an optical multi/demultiplexer device for wavelength division multiplexing optical signals.

For wavelength division multiplexing, or WDM, optical signals, a plurality of mutually independent optical signals has to be sent along a line, comprising optical fibers or waveguides, by means of multiplexing in the optical wavelength domain; the transmitted signals can be either digital or analog, and they are distinguished from each other in that each of them has a specific wavelength, separate from that of the other signals.

To implement this WDM transmission along a line, specific wavelengths of predetermined amplitude, termed "channels" in the following text, have to be assigned to each of the signals at different wavelengths. These channels, each identified in the following text by a wavelength value, called the central channel wavelength, have a certain spectral amplitude around the central wavelength value, which depends, in particular, on the characteristics of the signal source laser and on the modulation imparted to this to associate a data element with the signal. Typical values of spectral amplitude of the channels are 200 GHz or 100 GHz (ITU band). With this spectral amplitude the gap between one channel and one other channel is 1.6 nm or 0.8 nm.

In case of spectral amplitude substantially higher than 200 GHz the WDM signal is known as CWDM signal or "coarse WDM" signal.

Currently, in the telecommunication field, optical technology is mainly used for long-distance transmission of optical signals using the known properties of wide band provided by optical fibers. On the contrary, the most used technology for distributing signals to a plurality of users (such as for example, analogue and/or digital television and/or telephone signals) and for transmitting digital data between electronic apparatuses (such as for example, the Personal Computers of a LAN network) makes use of electric cables such as, for example, coaxial cables or those made up of copper pairs.

Nevertheless, electric cables have a relatively narrow band, and they are becoming a bottleneck with respect to the band of signals to be transmitted. Moreover, they present problems of electromagnetic interferences, of impedance matching, and they are difficult to be introduced into the appropriate raceways of a building since they are stiff. In addition, being bulky, they significantly reduce the number of cables that can be inserted into a raceway. Moreover, due to electrical safety requirements, they require the arrangement of separate raceways from those used for distributing electric energy.

Thus, the research is investigating the possibility of using optics not just in the long-distance transmission of signals, but also in the signal distribution networks from a common branch point to a plurality of user apparatuses. In fact, optical-fiber cables are suitable to be inserted into the appropriate raceways of a building since they are not too bulky, they are flexible, light, free from electromagnetic interferences, and their bending loss is very low. Moreover, they are suitable for being inserted into the same raceways used for distributing electric energy. Additionally, optical fibers potentially have a very wide band, low attenuation values, and they are transparent to the bit rate, to the format and to the code of transmission.

Moreover, among the various types of optical fiber, single-mode optical fibers are preferable since they are much less sensitive to bending losses, and they are less expensive, more rugged, with lower absorption losses than multimode fibers; they are suitable to be used for WDM or CWDM transmission, and they have a wider band, thus making a signal distribution network easily upgradeable.

U.S. Pat. No. 5,911,019 describes an optical fiber communication network comprising a fiber distribution node that is fed with a feeder optical cable from a central office; a plurality of network unit act to convert the signal from a fiber optic signal to an electrical signal. Said fiber distribution node comprises multiplexer/splitters which distribute communication signals to said network units. Finally, electrical cables for connecting said network units with a plurality of living units are used. Typically two bands of the frequency spectrum with wavelength of 1300 nm and 1550 nm are used to transmit individual voice channel back and forth from the living units to the central office. The band in 1550 nm range is used to transmit a single voice channel to the living units to the central office and a band in 1300 nm range is used in the reverse direction or vice versa.

An optical local area network is described in WO0150644.

Applicant of present invention has observed that in an optical local area network a WDM signal may be used for distributing a plurality of television and/or telephone and/or Internet digital or analog signal coming from a long-distance transmission via optical fiber to a plurality of electronic user apparatuses. For example, one channel of said WDM signal can be used for a Internet digital signal, another channel can be used for a television signal etc. In this way, each signal has a large band available. For correct reception of these transmission signals (WDM), it is necessary to provide a separation between the signals at different wavelengths, for directing them to the corresponding users of the network (optical local area networks). A demultiplexer device provides to realize said separation between the signals. Moreover, the signals of user apparatus like computers (Internet digital or analog signals) and telephone signals, are bi-directional. In this case the demultiplexer device must be used also like a multiplexer device.

To realize an optical multi/demultiplexer device many technologies are known. One technology exploits phase shifted Bragg filters. Those filters are conveniently used for the selection of single narrow-band channels and also for multichannel wavelength demultiplexing. The Article "Phase-Shifted Bragg grating filters with improved transmission characteristics" published on Journal of Lightwave Technology No 12 December 1995 describes a filter with a quarter wave shifted Bragg grating having an extremely narrow transmission peak in the center of the stop band but its shape is not suitable for system design. By introducing several phase shifted regions and properly choosing their location and magnitudes, the transmission spectrum can be tailored into a nearly rectangular shape.

The Applicant has observed that in said article the filter is applicable in high rate optical systems, a distance between a channel and an adjacent channel of 0.4 nm (3 dB bandwidth). Generally, the gap in high rate optical transmission system actually is around 200 GHz or 100 GHz (ITU band), with a gap in wavelength between one channel and one other channel of 1.6 nm or 0.8 nm.

Optical local area networks would use low cost devices and components, for example low cost transmission lasers to transmit optical signals trough the network, optical multiplexers, splitters and electronic devices. Usually, said lasers are significantly different from transmission lasers of long-haul optical telecommunication systems which are lasers at high cost. The lasers of long-haul optical telecommunication systems are temperature stabilized because substantial fluctuations of transmission wavelengths are detrimental. In DWDM (Dense-WDM) telecommunication system the channels are separated from each other less than 1 nm. Devices for stabilizing temperature and wavelength in lasers are at high cost.

Said lasers for an optical local area network preferably transmit channels which are separated from each other more than 1 nm. Preferably, a typical laser for optical local area network is a vertical cavity laser which transmits wavelengths in the range of 800–900 nm. The fluctuations of the central wavelength of said laser may be more than 0.5 nm.

The Applicant has addressed the problem of providing a CWDM multi/demultiplexer that is preferably applicable to optical WDM signals used in optical local area networks. In particular, the Applicant has addressed the problem of separating optical WDM signals having a large spectral amplitude. Each channel transports information that must be detected by a receiver. The CWDM multi/demultiplexer device should have a sufficiently flat band around the central wavelength value of each channel in a way to maintain the detectability of the information transported of each channel. Moreover, the Applicant has addressed the problem of providing a CWDM multi/demultiplexer at low cost, with small dimensions and possibly able to being easily coupled with electronic devices.

The Applicant has found that a filter that is able to separate channels of a CWDM optical signal with a large and flat spectral response may be realized by means of optical structures like gratings with a high gap modulated refractive index. These filters are able to separate optical WDM signals with a large band.

An optical structure with high gap refractive index is a structure comprising at least a first zone with a first refractive index and at least a second zone with a second refractive index, said first zone and second zone being adjacent each other, in wihch the gap between said first refractive index and said second refractive index is more than 0.1. In particular, said first zone is a zone with high refractive index (for example a block of silica having a refractive index of about .1.5), said second zone is a zone with low refractive index (for example a cut realized on a waveguide, air has a refractive index of about 1).

A optical structure with high gap modulated refractive index is a structure comprising a plurality of zones at high refractive index and a plurality of zones at low refractive index, between two consecutive zones at high refractive index one zone at low refractive index being formed, in which at least two of said plurality of zones at high refractive index have different dimensions from each other. Advantageously, at least two of said plurality of zones at low refractive index have different dimensions from each other.

The succession or alternation between zones at high refractive index and zones at low refractive index generates a plurality of transmissive couples and a plurality of reflective couples, both said transmissive couple and said reflective couple comprising one of said high refractive index zones and one of said low refractive index zones. In particular, each transmissive couple transmits an optical beam in a predetermined transmissive wavelength band and each reflective couple reflects a optical beam in a predetermined reflective wavelength band.

Preferably, said optical structure is substantially a symmetric structure with respect to the light propagation direction, that is, the first half of said structure is symmetric with respect to the second half.

The entire structure comprises a plurality of transmissive couples and a plurality of reflective couples in series. Preferably, the dimension of the transmissive couples are different from each other. Moreover, the dimension of the reflective couples may be diferent from each other.

Said alternation of transmissive couples and reflective couples generates a sufficiently wide transmissive band (pass band) between two adjacent reflective band (stop band).

The spectral response of said structure is the product of the spectral response of all couples (trasmissive and reflective). In this way the global spectral response is steeper than the spectral response of each single couple.

An "apodized" structure, in which between a first transmissive couple and a second transmissive couple at least a reflective couple is disposed, generates a more flat transmissive band (pass band) than in a structure in which consecutive transmissive couples are disposed. The increase of the width of successive blocks in an apodized structure further contributes to obtain a flat pass band. The increase of the number of consecutive reflective couples generates is a further step to obtain a flat pass band.

In particular, the Applicant has realized a multi/demultiplexer device on a semiconductor substrate comprising waveguides on which said filters are provided. Said filters comprise a resonant structure formed by a plurality of said zones with high refractive index and a plurality zones with low refractive index disposed in predetermined positions of said waveguide.

A first aspect of the present invention regards an optical multi/demultiplexer device comprising
   a substrate,
   a plurality of waveguides on said substrate,
   at least a wavelength selective filter realized on one of said plurality of waveguides,
   said at least one filter being able to transmit a first predetermined band of wavelengths and to reflect a second predetermined band of wavelengths, wherein said at least one filter comprises:

at least a first zone with a high refractive index and at least a second zone with a low refractive index, said first zone and second zone being adjacent each other and forming a plurality of transmissive couples providing said first predetermined band and a plurality of reflective couples providing said second predetermined band disposed in series to each other, in a way to form a structure with high gap modulated refractive index.

Preferably, said zones with a low refractive index are realized by means of a plurality of transverse cuts provided on said waveguides and said zones with a high refractive index are blocks formed between two consecutive cuts.

Preferably, each couple comprises one cut and one block.

Preferably, between a first transmissive couple and a second transmissive couple at least a reflective couple is disposed.

Preferably, in the first half of said filter the blocks of said trasmissive couples increase in width in the direction of propagation of the light.

Preferably, in said first half consecutive reflective couples increase in number in the direction of propagation of the light.

Preferably, said reflective couples have the same width.

Preferably, a second half of said filter has an opposite correspondence with the first half.

In particular, said second half of the structure is symmetric of said first half.

In particular, in said reflective couples the sum of the width of said cut and the width of said block is substantially an odd multiple of a quarter of the central wavelength of said second predetermined band.

In particular, in said transmissive couples the sum of the width of said cut and the width of said block is substantially an even multiple of a quarter of the central wavelength of said first predetermined band.

Advantageously, at least one of said plurality of wave guides comprises a ridge. In particular, said substrate is a semiconductor substrate A further aspect of present invention regards an optical wavelength selective filter realized on an optical waveguide, said filter being able to transmit a first predetermined band of wavelengths and to reflect a second predetermined band, characterized in which it comprises:

at least a first zone with a high refractive index and at least a second zone with a low refractive index, said first zone and second zone being adjacent each other and forming a plurality of transmissive couples providing said first predetermined band and a plurality of reflective couples providing said second predetermined band disposed in series to each other, in a way to form a structure with high gap modulated refractive index.

Preferably, said zones with a low refractive index are realized by means of a plurality of transverse cuts provided on said waveguides and said zones with a high refractive index are blocks formed between two consecutive cuts.

A further aspect of present invention regards a method for realizing an optical wavelength selective filter on a substrate comprising the following steps:

providing a waveguide in a optical conductive material on said substrate, providing a plurality of cuts on said waveguide, in a way to form a plurality of transmissive couples providing a first predetermined band of wavelengths and a plurality of reflective couples providing a second predetermined wavelength band disposed in series to each other.

Further features and advantages of the present invention will appear more clearly from the following detailed description of a preferred embodiment, made with reference to the attached drawings. In such drawings:

FIG. 6b, illustrates one graph of the spectral response of filter of FIG. 6a.

FIG. 7b, illustrates one graph of the spectral response of filter of FIG. 7a

Figure 1:
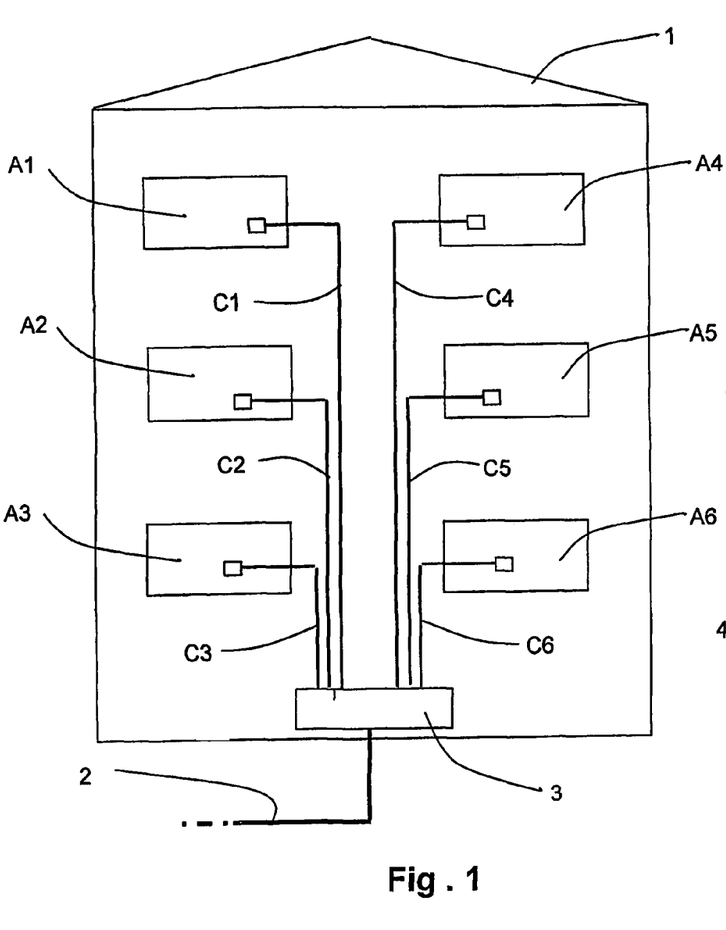
FIG. 1 shows schematically an optical local area network installed in a building according to present invention.

FIG. 1 shows schematically an example of an optical local area network, installed in a building 1, comprising an external optical cable 2, for example incoming from an external system of telecommunication, which is connected to a distribution unit 3 exemplarily arranged in a cellar or basement of said building 1 or at another convenient location in or close to the building.

In general, optical local area networks can be used, for example, for distributing a plurality of television and/or telephone and/or Internet digital or analog signals coming from a long-distance transmission via satellite and/or via coaxial cable and/or via optical fiber and/or through the air to a plurality of electronic user apparatuses.

In FIG. 1, the building 1 comprises a plurality of living units A1–A6; for example said living units are subdivided in three floors. Each of said living units is provided with a suitable raceway apt to receive at least one connection cable C1–C6 carrying said digital or analog signals.

The term living unit as used herein is somewhat of a misnomer as it includes any subscriber who receives and/or sends services from/to the network.

Said connection cable may be an optical cable or an electrical cable or an hybrid cable in which both optical signals and electrical signals are present.

Figure 2:
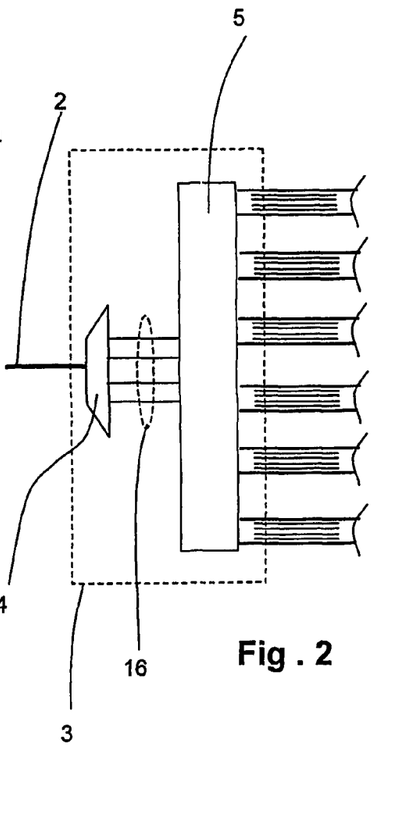
FIG. 2 shows schematically a distribution unit arranged in a cellar or basement of the building of FIG. 1.

As shown in FIG. 2, said distribution unit 3 comprises an optical multi/demultiplexer device 4 and a distribution device 5. Said multi/demultiplexer device 4 separates from each other the channels, or group of channels, of the WDM signals incoming from the external optical cable 2, and said distribution device 5 splits each of the single wavelength channels, or each group of channels, preferably in a number of signals corresponding to the number of living units and couples the signals to a plurality of said connection cables. An example of said connection cable is described in patent application U.S. Pat. No. 5,978,536.

Preferably, said distribution device 5 comprises a beam splitter suitable to route a digital optical signals coming from the multi/demultiplexer device 4 on input/output optical ports. Said input/output ports are advantageously bi-directional ports.

The distribution device 3 alternatively may comprise an opto-electrical conversion unit (not shown) in which the optical signals from the multi/demultiplexer device 4 may be converted in electrical signals.

In this embodiment, the distribution device 5 distributes digital signals to a plurality of users, for example, according to a 100 Mbit/s Fastethernet™ protocol. Said signals arrive in optical form to said multi/demultiplexer device 4. Then, they are converted into corresponding electric signals by said opto-electrical conversion unit. Moreover, the distribution unit is suitable to select, among the electric signals, the digital signal intended for each user (for example, according to a 10 Mbit/s Ethernet™ protocol) and to send it to a corresponding opto-electronic converter. Said converter converts the digital electric signal intended for the user into a corresponding optical signal and sends it to the corresponding user apparatus through said connection cable.

An optical local area network advantageously uses low cost transmission lasers to transmit optical signals through the network. Usually, said lasers are significantly different from transmission lasers of long-haul optical telecommunication systems which are lasers at high cost. The lasers of long-haul optical telecommunication systems are temperature stabilized because substantial fluctuations of transmission wavelengths are detrimental. In DWDM telecommunications system the channel are usually separated from each other less than 1 nm.

In optical local area networks preferably channels are separated from each other more than 1 nm. More preferably, said channels are separated from each other more than 1.6 nm.

A tipycal laser for optical local area networks is a vertical cavity laser which transmits wavelengths in the range of 800–900 nm. However, the multi/demultiplexer device of the present invention can alternatively be designed to separate channels which are in a different range of wavelengths (for example around 1300 nm).

Said lasers need be temperature stabilized and the central transmission wavelengths are free to fluctuate, for example under the effect of temperature changes, of more than 0.5 nm. The multi/demultiplexer device of the present invention has a large band to overcome these fluctuations of the central wavelength.

Figure 3:
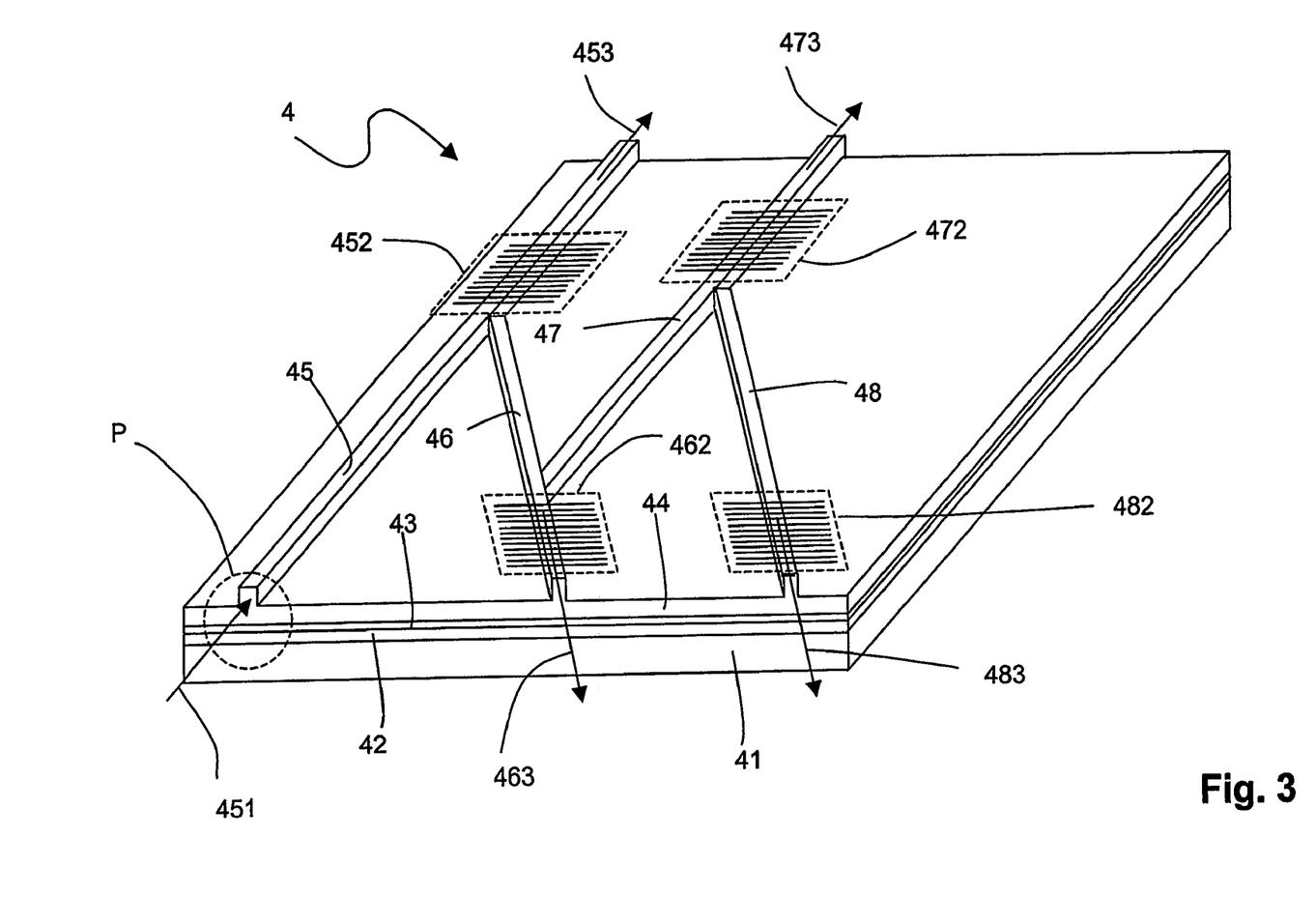
FIG. 3 shows a multi/demultiplexer device of the network of FIG. 1 according to present invention.

The multi/demultiplexer device 4 as shown in FIG. 3, comprises a substrate 41, preferably realized in a semiconductor material, for example silicon. On said substrate a plurality of layers is superposed. In particular, on the top of said substrate 41 a first layer 42 is superposed. Preferably, said first layer is of silica (silicon dioxide). On the top of said first layer 42 a second layer 43 is arranged.

Preferably, said second layer is of silica nitride (SiOxNy). On the top of said second layer 43 a third layer 44 is arranged. Preferably, said third layer is of silica.

Said first layer and said third layer are respectively a bottom cladding and a top cladding of a waveguide, and said second layer represents a core of said waveguide. All the material are optical transmissive materials.

Figure 4:
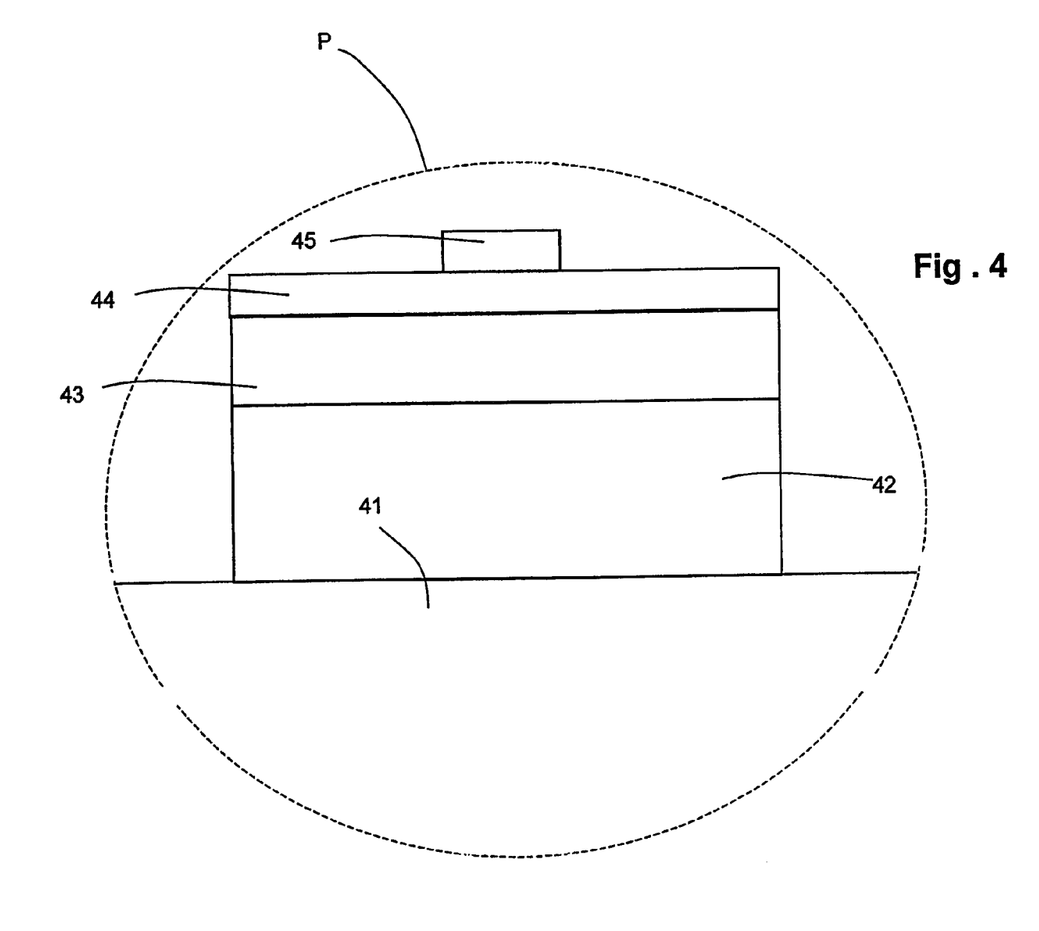
FIG. 4, illustrates a lateral view of a portion of said multi/demultiplexer device in which are shown a plurality of layers according to present invention.

On the surface of said third layer 44 a plurality of ridges is provided. The shape of said ridges determines the lateral confinement and the propagation direction of the optical beam which travels along the waveguide. In FIG. 4, a portion P, in a lateral view, of said multi/demultiplexer device of FIG. 3 is illustrated, in which said plurality of layers is shown.

In the example of FIGS. 3 and 4, said waveguides with ridges are provided. A different kind of waveguides may be provided, for example a buried waveguide in which a guided element is buried into a layer for example of silica Said guided element works like a ridge and it determines the lateral confinement and the propagation direction of the optical beam which travels along the waveguide. Another used waveguide is an arrow waveguide like a photonic crystal in which on a optical substrate a plurality of holes are provided. The position of said holes determines a waveguide on said optical substrate.

In particular, in FIG. 3 a first ridge 45 a second ridge 46 a third ridge 47 and a fourth ridge 48 are provided. Preferably, the first ridge crosses the entire layer, one end of said ridge being an input port 451 for a WDM signal.

Along said first ridge 45 a first filter 452 is provided. The optical beam incoming from said input port 451 is partially reflected by said first filter and partially transmitted to a first output port 453 at the other end of said first ridge 45. The reflected beam is directed to one end of said second ridge 46. Along said second ridge 46 a second filter 462 is provided. The optical beam incoming from the end of said second ridge 46 is partially reflected by said second filter 462 and partially transmitted to a second output port 463 at the other end of said second ridge 46. The reflected beam is directed to one end of said third ridge 47. Along said third ridge 47 a third filter 472 is provided. The optical beam incoming from the end of said third ridge 47 is partially reflected by said third filter 472 and partially transmitted to a third output port 473 at the other end of said third ridge 47. The reflected beam is directed to one end of said fourth ridge 48. Along said fourth ridge a fourth filter 482 is provided. The optical beam transmitted to said fourth filter 482 is output to a fourth output port 483.

Said filters are preferably optical wavelength-selective filters. In particular, each filter is able to reflect a predetermined wavelength or a predetermined wavelength interval in a predetermined bandwidth. The remaining wavelengths in the predetermined bandwidth are preferably transmitted across the filter.

In the example of FIG. 3 said filters along said ridges are provided. Equivalently, said filter on other kind of waveguides as above cited, may be provided.

Said filter may be realized by means of optical structures like gratings with a high 10 gap modulated refractive index.

A optical structure with high gap refractive index is a structure comprising at least a first zone with a first refractive index and at least a second zone with a second refractive index, said first zone and second zone being adjacent each other, in which the gap between said first refractive index and said second refractive index is more than 0.1. In particular, said first zone is a zone with high refractive index said second zone is a zone with low refractive index.

A optical structure with high gap modulated refractive index is a structure comprising a plurality of zones at high refractive index and a plurality of zones at low refractive index, between two consecutive zones at high refractive index one zone at low refractive index being formed, in which at least two of said plurality of zones at high refractive index have different dimensions from each other.

Advantageously, at least two of said plurality of zones at low refractive index have different dimensions from each other.

Said optical structure is preferably a symmetric structure with respect to the light propagation direction, that is, the first half of said structure is symmetric with respect to the second half.

Said zones at high refractive index and said zones at low refractive index may be realized by means of material of different optical characteristic. In particular, said zone at high refractive index may be a silica based material refractive index≅1.5), said zone at low refractive index can be made by means of a cut realized in said silica material (air refractive index=1). Alternatively, said zones may be realized by means of other material, provided that between a zone at high refractive index and a zone at low refractive index a high gap of refractive index is present. In particular in the example illustrated in FIGS. 3 and 4 and 5 the zones at low refractive index are realized by means of cuts. In fact, a cut is easily realized on a ridge. In other kind of waveguides said zones at low refractive index may be realized by inserting a piece of a predetermined material.

Figure 5:
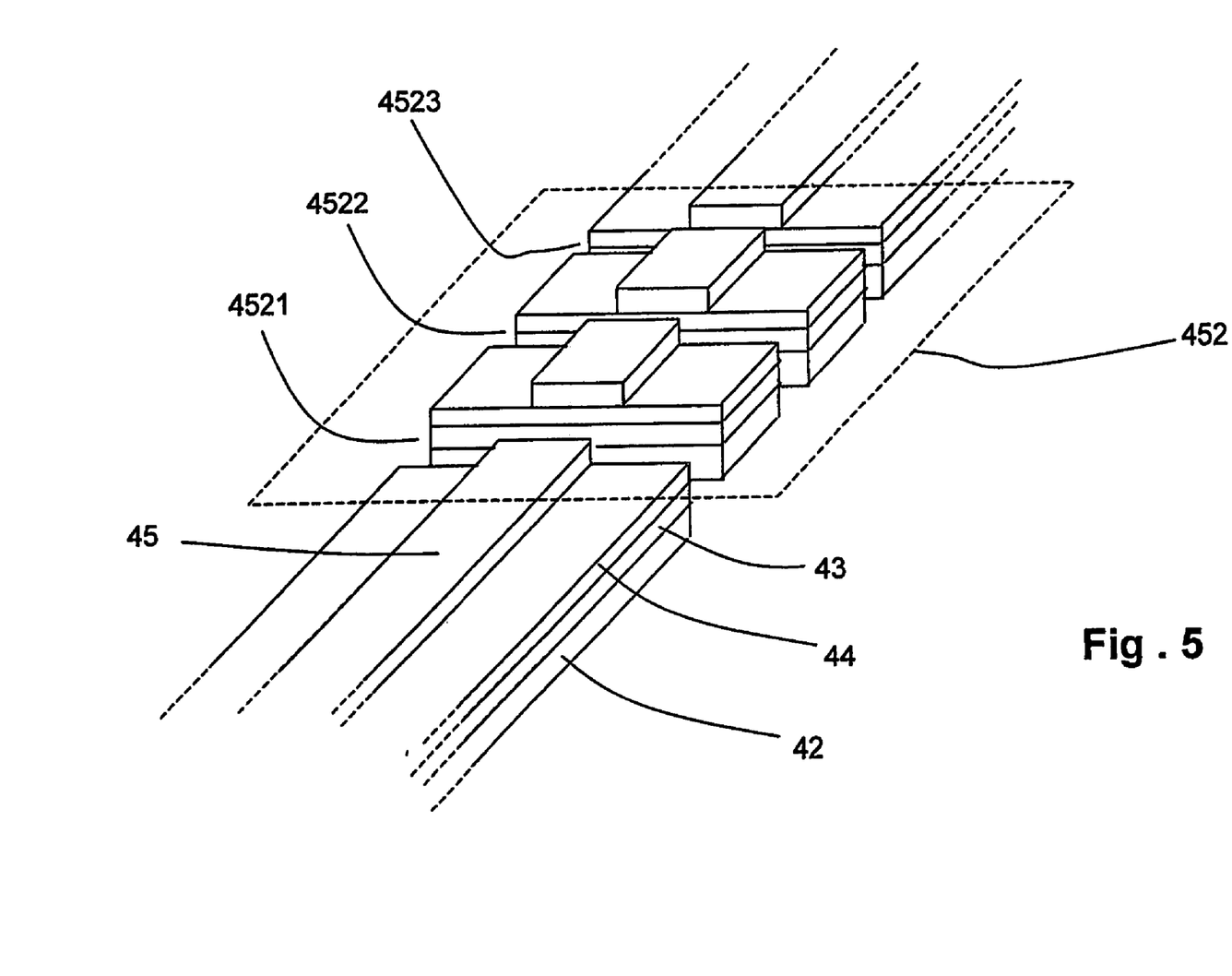
FIG. 5, illustrates one view of a wavelength selective filter according to present invention.

In FIG. 5, along said ridge a plurality of cuts are provided. Said cuts have a depth preferably equal to the depth of the ridge and the three layers. The cuts have a transverse predetermined direction of cutting with respect to the length direction of the ridge along which they are done. The cuts may be realized for example by means of electron beam lithography and by a successive etching. This is a known technique of the microelectronic technical field. Other techniques can be used for making the cuts.

For example, in FIG. 5 a first cut 4521, a second cut 4522 and a third cut 4523 are illustrated. Said cuts may be emptied to create vacuum or may be filled by air, another gas or a liquid and said cuts generate at least a resonant structure like a grating; in particular, a structure with a modulated refractive index is provided along the optical waveguide. In fact, an index of refractive step or gap arises between the refractive index of the layers (for example silica refractive index≅1.5) and that of air (refractive index≅1). Between two consecutive cuts a block is formed.

Such filter reflects some wavelengths in a predetermined band (stop band) and transmits other wavelengths in a predetermined band (pass band). Preferably, the direction of cutting is chosen to direct said reflected beam at wavelengths in said stop band to another ridge on the substrate.

Figure 6A:
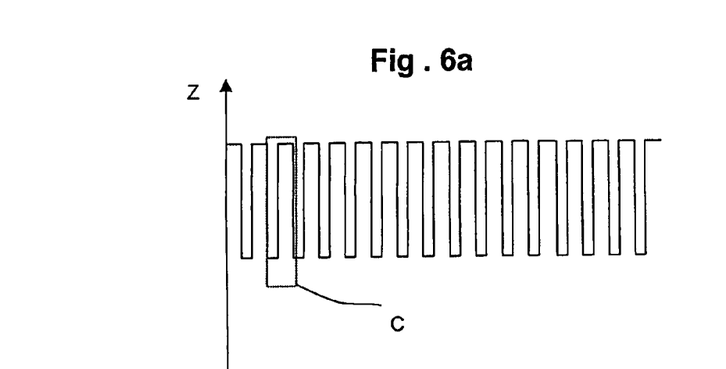
FIG. 6a, illustrates one view of a wavelength selective filter.
Figure 7A:
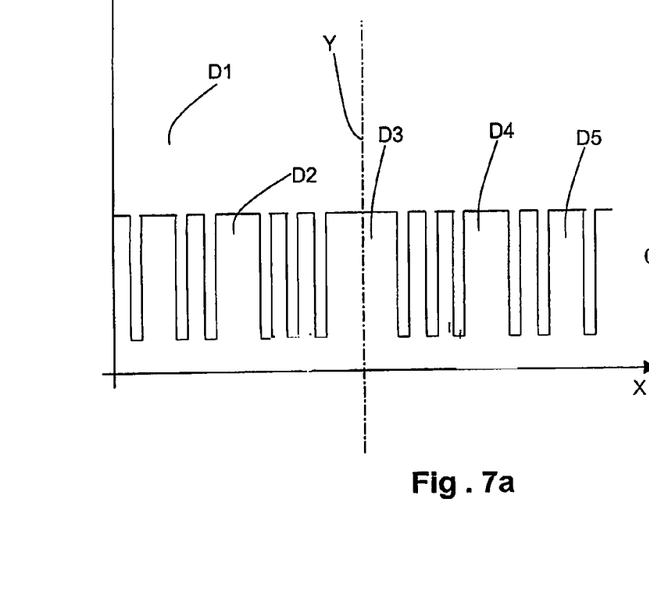
FIG. 7a, illustrates one view of a wavelength selective filter according to present invention.

Example of structures generated by cutting said ridges are schematically illustrated, in a lateral view, in FIGS. 6a and 7a.

The two figures are positioned in a way to facilitate the comparison between them.

In particular, the structures are disposed with respect to a couple of Cartesian axes X,Z, where X indicates the position along the light propagation direction, Z indicates the position in the depth direction of the cuts.

Figure 6B:
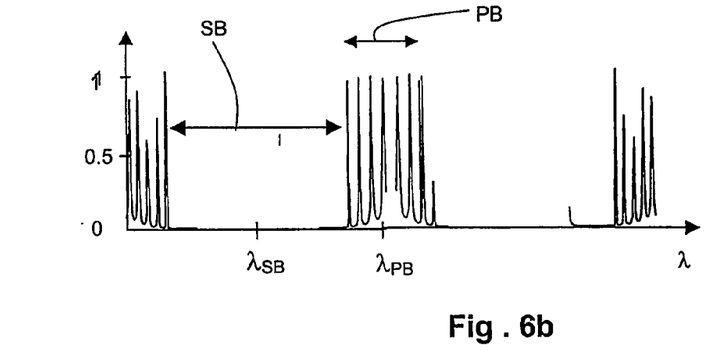

In particular, in FIG. 6a a structure with a plurality of transverse cuts, each cut preferably having a same width, is illustrated. This kind of structure is a resonant structure and permits to have a transmission spectral response in a predetermined wavelength band as shown in FIG. 6b. In particular, the graph of FIG. 6b illustrates a reflection band SB and a transmission band PB in a domain of wavelengths λ. The width of the cuts and the distance between a cut and the next cut determine the central wavelength $\lambda_{SB}$ of the stop band SB, the central wavelength $\lambda_{PB}$ of the pass band PB and the width of said SB and PB.

In FIG. 6a a cell element C comprises a cut and a block of layers. In particular, the length of the cell $d_c$ is:

$$d_c = d_{cut} + d_{block}.$$

For the above definitions it is intended that the dimensions of the cuts and the blocks are calculated with respect of the refractive index of the material of the blocks and the cuts (for example SiO2 for blocks and air for cuts).

In particular:

$$d_{cut} = d_{cut}'/n_{eff\,cut}$$

$$d_{block} = d_{block}'/n_{eff\,block}$$

where $d_{cut}'$ and $d_{block}'$ are respectively the real dimension of the cut and the block and $n_{eff\,cut}$, $n_{eff\,block}$ are respectively the effective refractive index of the cut and the block.

The value of the central wavelength $\lambda_{SB}$ of the stop band SB depends from $d_c$, in particular $d_c$ is substantially a multiple of $\lambda_{SB}/2$.

A cell element has a length dc substantially multiple of $\lambda_{SB}/2$.

The above condition is verified for example if:

$$d_{cut} = \lambda_{SB}/4n_{air} \text{ and}$$

$$d_{block} = \lambda_{SB}/4n_{block}$$

From the above relations it is possible to choose the dimension of the cuts and the distance between two adjacent cuts once the stop band SB for the filter has been selected.

From the graph of FIG. 6b, the Applicant has observed that the pass band PB of the filter of FIG. 6a comprises some undesirable peaks. Moreover, by introducing cuts all of the same dimension (FIG. 6a) it is not possible to choose the width of the stop band independently from the width of the pass band.

In FIG. 7a, an example of an "apodized" structure is illustrated. In particular, said structure comprises a plurality of cuts in predetermined positions of the ridge. The structure of the filter comprises at least one defect which is represented by a different dimension of at least one of said blocks. Preferably, said blocks generated by said cuts are of different dimension and the cuts are not equidistant from each other.

This means that the variations of the effective refractive index are not strictly periodic; but the variations of refractive index varies between at least two values correspondent to the refractive index of cuts and blocks. The pitch of said variation is variable along the filter.

This kind of structure generates a new pass band which is comprised into the stop band of the filter of FIG. 6a (see graphic of FIG. 6b). It has to be noted that the graphs of FIG. 6b and FIG. 7b have correspondent vertical axis and the same wavelength (horizontal) scale. The structure of FIG. 7a comprises a plurality of substructures each comprising at least a cut and a block. Said substructures are disposed adjacent to each other.

For the purpose of the present invention a reflective substructure or reflective couple comprises one cut and one block, in which the sum of the width of said cut and the width of said block is substantially an even multiple of $\lambda_{SB}/4$, where $\lambda_{SB}$ is the central wavelength of the stop band or reflective band.

For the purpose of the present invention a transmissive substructure or transmissive couple comprises one cut and one block, in which the sum of the width of said cut and the width of said block is substantially an odd multiple of $\lambda_{PB}/4$, where $\lambda_{PB}$ is the central wavelength of the transmissive band or pass band. Said block of said transmissive couple comprises the above-cited defect.

Each one of said substructures is also a resonant structure having a reflection band and a transmission band respectively centered in $\lambda_{SB}$ and $\lambda_{PB}$ as above defined.

For the purpose of the present invention an "apodized" structure comprises a plurality of transmissive couples and a plurality of reflective couples, in which between a first transmissive couple and a second transmissive couple at least a reflective couple is disposed.

Preferably, a first half of the structure comprises at least a first and a second transmissive couple in which the width of the block of the second transmissive couple is bigger than the width of the block of first transmissive couple.

In other words in said first half of the filter in the direction of propagation of light the width of the block of successive transmissive couples increase.

Moreover, in said first half the dimensions of the reflective couples may be different each other. Advantageously, in said first half of the structure consecutive reflective couples increase in number.

In particular, for the purpose of the present invention "increase in number" means that in said first half of the filter in the direction of propagation of light the number of consecutive reflective couples may be the same or may be increased.

Preferably, said reflective couples have the same width.

Preferably, a second half of the structure has an opposite correspondence with said first half. For the purpose of the present invention "opposite correspondence" means that the first half of the structure has the same configuration about the number of the trasmissive couples and the reflective couples and about the disposition in sequence of them.

Preferably said second half of the structure is symmetric to said first half. That is, the modulation of refractive index in said first half is opposite proportional to the modulation of the refractive index in said second half. In particular a symmetric structure has the first half specular to the second half.

As above described the structure comprises a plurality of substructures or couples (reflective and transmissive) in series; each of said substructures is a filter itself, and the structure in total comprises many filters in series. Said alternation of transmissive couples and reflective couples generates a sufficiently wide transmissive band (pass band) between two adjacent reflective band (stop band).

Moreover, the spectral response of the structure in total in the pass band and also in the stop band is more stepped than the spectral response of a single filter. In other words the number of defects of the transmissive couples determines the stepness of the pass band and the stop band of the structure. The transmission couple having the biggest defect of the entire structure determines substantially the width of the pass band. In fact, the width of the defects is in opposite relationship with the bandwidth of the pass band.

An "apodized" structure, in which between a first transmissive couple and a second transmissive couple at least a reflective couple is disposed, generates a more flat transmissive band (pass band) than in a structure in which consecutive transmissive couples are disposed. Said increase of the width of successive blocks in an apodized structure further contributes to obtain a flat pass band. Said increase of the number of consecutive reflective couples is a further step to obtain a flat pass band.

Advantageously, the symmetric structure generates a symmetric pass band with respect to the central wavelength $\lambda_{SB}$ of the pass band.

In the example of FIG. 7a the filter comprises five defects D1–D5. In the first half of said filter, between a defect and the next defect a increasing number of cuts is provided and the width of the defects increases. In the second half of said filter, between a defect and the next defect a decreasing number of cuts is provided and the width of the defects decreases.

The complete structure of FIG. 7a, comprises a first substructure and a second substructure which are symmetric with each other. In particular, the structure is symmetric with respect to a vertical axis Y. Said vertical axis Y is in the middle of said third block D3.

Said first block D1 has preferably a width $d1=m_1 \lambda PB/2$, said second block D2 has preferably a width $d2=m_2 \lambda_{PB}/2$, said third block D3 has preferably a width $d3=m_3 \lambda_{PB}/2$, said fourth block D4 has preferably a width $d4=\lambda_{PB}/2$, said fifth block D5 has preferably a width $d5\ m_5\ \lambda_{PB}/2$, where $m1 \leq m2 \leq m3 \geq m4 \geq m5$ are integers. Preferably, m1=m5 and m2=m4. Generally, the choice of the parameter m determines the width of the new pass band PB' generated. Advantageously, by varying the value of m1–m5 it is possible to determine the flattened band of the pass band.

Figure 7B:
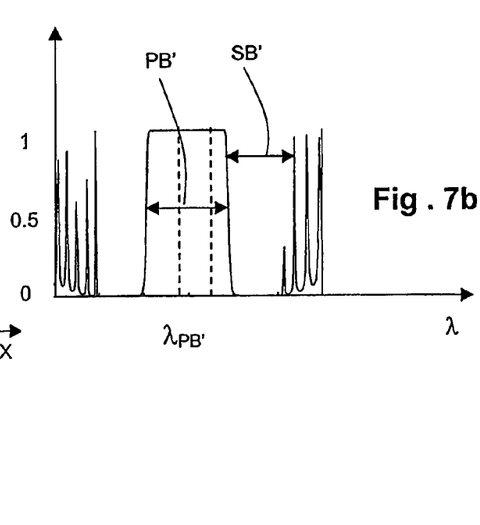

In FIG. 7b, a graph of the spectral response in wavelength of the filter of FIG. 7a is shown. The new pass band PB' is centered on a wavelength $\lambda_{PB'}$, which is correspondent to the central wavelength $\lambda_{SB}$ of the stop band of FIG. 6b. It has to be noted that the dimensions of the cuts of the examples of FIG. 6 and FIG. 7 are the same.

This new pass band PB' is substantially flat, and also the new stop band SB' is substantially flat. This means that both the reflected channels and the transmitted channels by the filter maintain substantially the same shape. Each signal which is associated with a channel reflected or transmitted is substantially not affected by distortions.

The cuts are regions in which the light is not guided; to the contrary the light into the blocks is guided. The width of such cuts may determine losses of the optical power of the channels. At wavelengths around 1500 nm the cuts may be around 360–380 nm. In this case, the losses may be reduced by reducing the dimension of the cuts and by increasing the dimensions of correspondent block into the same couple.

Figure 11:
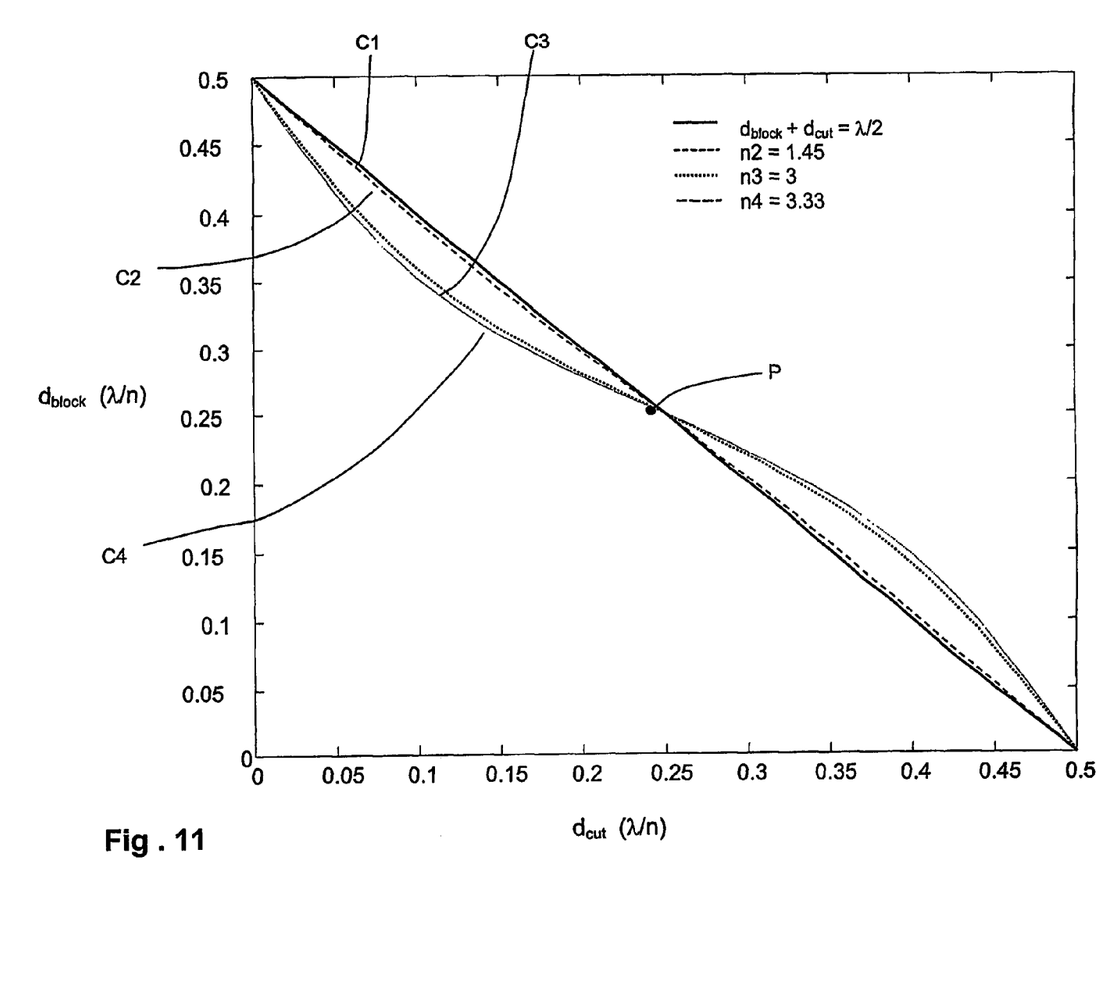
FIG. 11 shows a graph of the width of a block and a cut for a reflective couple.

For example in FIG. 11 a graph of the dimension of a block and a cut which give a reflective couple is shown. In particular, four curves are shown. A first curve C1 is with $d_{cut}+d_{block}=\lambda/2$ and with a refractive index of the material (block) n1=1.5. Said curve is substantially a straight line. A second curve C2 is with a refraction index of the material (block) of n2=1.45. A third curve C3 is with a refractive index of the material (block) of n3=3. A fourth curve C4 is with a refractive index of the material (block) of n4=3.33.

Said curves C2, C3 and C4 show how it is possible to compensate the variation of the width of the cut with another variation of the width of the block. The point P is the point in which the resonance of the filter is complete that is the condition $d_{cut}+d_{block}$ is exactly a multiple of $\lambda/2$, but the curves show that a condition of substantial resonance may be found with different dimension of cuts and blocks.

EXAMPLE

The Applicant has carried out simulations of one filter of a multi/demultiplexer device with the configuration shown in FIGS. 3–4. In particular, in the simulation the dimension of the layers and of the ridges are:
Bottom cladding 42 height=8.57 μm.
Core 43 height=896 nm.
Top cladding 44 height=208 nm.
Layers 42,43, and 44 width=40 μm.
All ridges height=100 nm.
All ridges width=6 μm.

The used materials (silica for the ridges and for the bottom and top cladding, silica nitride for the core) are in relation with the transmitted wavelengths. In particular, the multi/demultiplexer device of FIG. 3 is able to separate four channel at therespective wavelengths of 810, 830, 850, 870 nm. At different wavelengths it is possible to use other materials, for example gallium arsenide, indium phosphate aluminum.

Each filter is centered on one of said transmission wavelengths. In particular, the first filter 452 transmits the signal at 810 nm and reflects the other wavelengths. The second filter 462 transmits the signal at 830 nm and reflects the other wavelengths. The third filter 472 transmits the signal at 850 nm and reflects the other wavelengths. The fourth filter 482 transmit the signal at 870 nm and reflects the other wavelengths.

Figure 8:
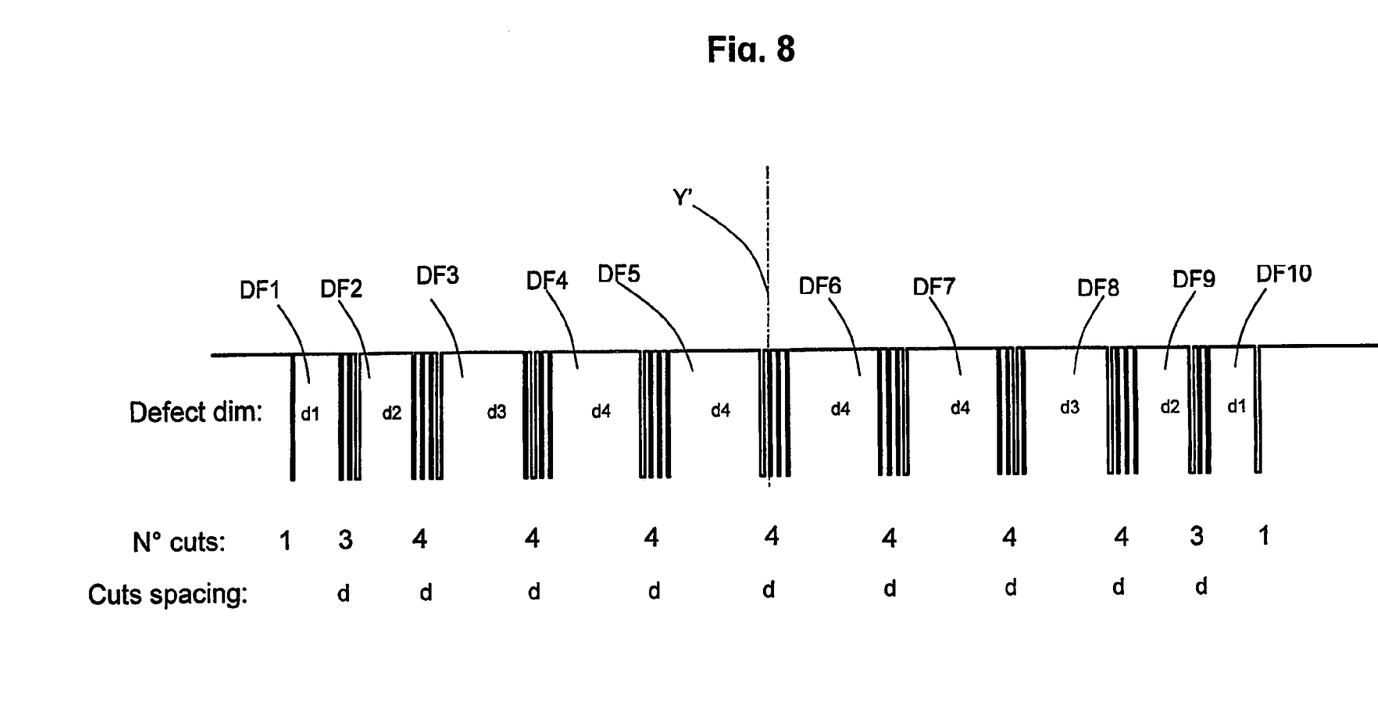
FIG. 8, illustrates one simulation view of a wavelength selective filter according to present invention.

The simulation regards the second filter 462 of the device. The other filters may be designed with a substantially similar method. In FIG. 8 a schematic view of the filter is illustrated.

The filter comprises ten defects DF1–DF10 and thirty-six cuts. In particular, the filter is symmetric with respect to a vertical axes Y' (dimension of D1 equal to dimension of D10, dimension of D2 equal to dimension or D9, etc . . . ). The structure comprises in series a first transmissive couple (first defect DF1), two reflective couples, a second transmissive couple (second defect DF2), three reflective couples, a third transmissive couple (third defect DF3), three reflective couples, a fourth transmissive couple (fourth defect DF4), three reflective couples, a fifth transmissive couple (fifth defect DF5), three reflective couples, a sixth transmissive couple (sixth defect DF6), three reflective couples, a seventh transmissive couple (seventh defect DF7), three reflective couples, a eighth transmissive couple (eighth defect DF8), three reflective couples, a ninth transmissive couple (ninth defect DF9), two reflective couples, a tenth transmissive couple (tenth defect DF10).

The dimension of the cuts and the defects are the following.

Width of cuts $d_{cuts}$=102 nm.
Width of blocks between cuts other than defects D1, . . . D10" d=204 nm.
Width of defects D1 and D10 is $d_1$=1725 nm.
Width of defects D2 and D9 is $d_2$=2000 nm.
Width of defects D3 and D8 is $d_3$=3103 nm.
Width of defects D4, D5, D6 and D7 is $d_4$=3379 nm.

Figure 9:
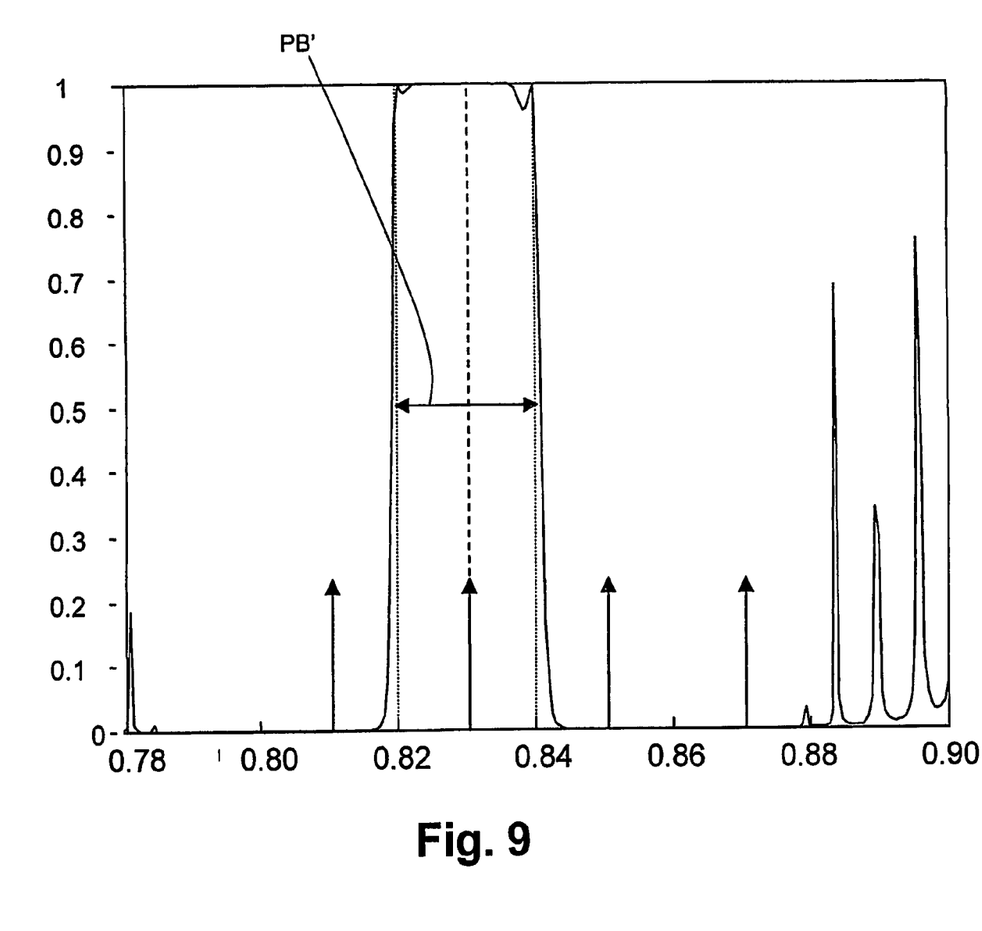
FIG. 9, illustrates one graph of the spectral response of filter of FIG. 8.

The spectral response of said filter is shown in FIG. 9. Said graph is the spectral response for an incident optical beam directed for example perpendicular to the plane of the cuts. The graph of FIG. 9, is a good practical approximation of the spectral response of an angled filter, like the filters of FIG. 3 in which said incident beam has the same direction of the ridge. In such case, the ridges of the waveguides are not perpendicular to the plane of the cuts, but the ridge are directed in a way to guide the reflected beam in the next waveguide.

The central wavelength of the pass band PB' is substantially around 830 nm; this means that a channel at a such wavelength is transmitted by said filter.

The multi/demultiplexer of the present invention is a bi-directional device. The signals at different wavelengths may travel along the waveguides in both directions. Moreover, the filters are bi-directional filters. In an optical local area network bi-directional signals may advantageously be provided. For example, telephone and/or Internet digital or analog signals need bi-directional devices. In the example a four channel multi/demultiplexer device is shown. Equivalently, more channels may be added. In particular a fifth channel, for example a monitor signal, in a opposite direction may be used. In this case a further waveguide (ridge) and a further filter on the substrate are provided.

The device of present invention is realized on a semiconductor substrate. Advantageously, on the same substrate it is possible to realize electronics circuits. The substrate may comprise advantageously both optical devices and electronic devices; thus, the present invention provides a compact device and with reduced dimensions.

Figure 10:
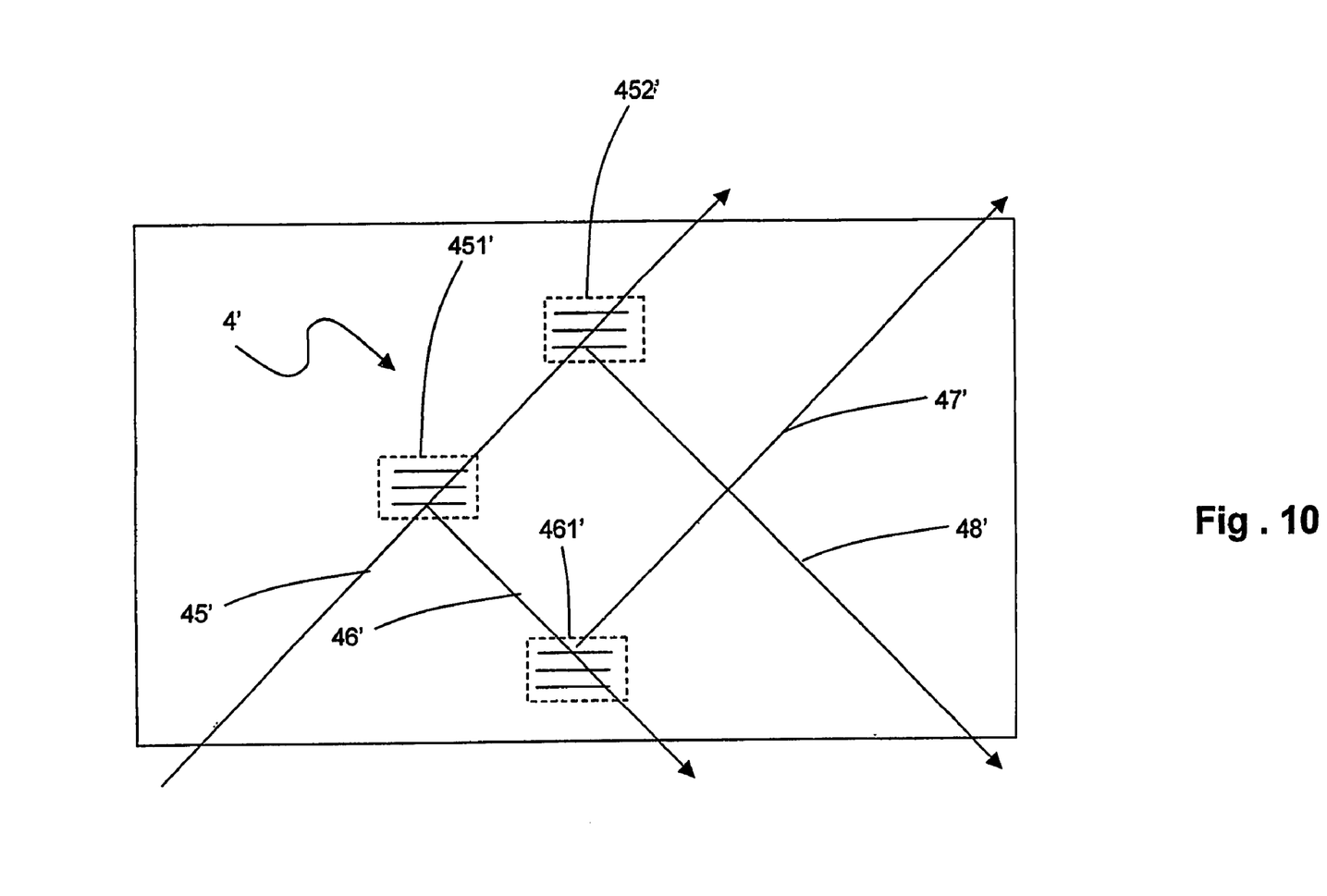
FIG. 10 shows a further embodiment of a multi/demultiplexer device of the network of FIG. 1 according to present invention.

The present invention may provide many configurations of the optical multi/demultiplexer device. In FIG. 10, for example, an alternative scheme of the multiplexer device 4' is shown. In the example said device is able to separate a CDWM signal having four channels respectively at 810 nm, 830 nm, 850 nm, and 870 nm. In particular, the device comprises a first waveguide 45' a second waveguide 46' a third waveguide 47' and a fourth waveguide 48'. On said first waveguide a first filter 451' and a second filter 452' are formed. On said second waveguide 46' a third filter 461' is formed. At the end of first waveguide a CWDM signal is input. The first filter 451' transmits the channels at 850 nm and 870 nm, and reflects the two remaining channels into the second waveguide 46'. The second filter 452' transmits the channel at 850 nm to an output and reflects the channel at 870 nm to said fourth waveguide 48' and to a further output. The third filter transmits the 830 nm channel to a further output and reflects the 810 nm channel to said third waveguide 47' and to a further output. In this embodiment the first filter is able to transmit a band which comprises two channels (from 840 to 880 for example). By means of the present invention it is possible to provide filters with an extremely large band; said large band may comprise more than one channel.

The invention claimed is:

1. Optical wavelength selective filter realized on an optical waveguide, said filter being able to transmit a first predetermined band of wavelengths (PB') and to reflect a second predetermined band (SB') and comprising a plurality of transmissive couples providing said first predetermined band and a plurality of reflective couples providing said second predetermined band disposed in series to each other, each transmissive couple and each reflective couple comprising a first zone with a high refractive index and a second zone with a low refractive index adjacent to each other in a way to form a structure with high gap modulated refractive index, the structure comprising a first substructure and a second substructure in the direction of propagation of the light, wherein the first substructure comprises at least a first and a second transmissive couple in the direction of propagation of the light, the width of the zone with high refractive index of the second transmissive couple being higher than the width of the zone with high refractive index of the first transmissive couple.

2. Optical wavelength selective filter as claimed in claim 1, in which said zones with a low refractive index are realized by means of a plurality of transverse cuts provided on said waveguides and said zones with a high refractive index are blocks formed between two consecutive cuts.

3. Optical wavelength selective filter as claimed in claim 2, wherein each couple comprises one cut and one block.

4. Optical wavelength selective filter as claimed in claim 1, wherein between a first transmissive couple and a second transmissive couple at least a reflective couple is disposed.

5. Optical wavelength selective filter as claimed in claim 1, wherein the second substructure comprises at least two transmissive couples having the zones with high refractive index decreasing in width in the direction of propagation of the light.

6. Optical wavelength selective filter as claimed in claim 1, wherein in the first sub structures the zones with high refractive index of the plurality of transmissive couples increase or are equal in width in the direction of propagation of the light.

7. Optical wavelength selective filter as claimed in claim 5, wherein in the second substructure: the zones with high refractive index of the plurality of transmissive couples decrease or are equal in width in the direction of propagation of the light.

8. Optical wavelength selective filter as claimed in claim 4, wherein in said first substructure consecutive reflective couples between a transmissive couple and another increase are equal in number in the direction of propagation of the light.

9. Optical wavelength selective filter as claimed in claim 4, wherein in the second substructure consecutive reflective couples between a transmissive couple and another decrease are equal in number in the direction of the propagation of the light.

10. Optical wavelength selective filter as claimed in claim 1 wherein said reflective couples have the same width.

11. Optical wavelength selective filter as claimed in claim 1, wherein the structure has a first and a second half, the second half having a same configuration about the number of transmissive couples and reflective couples, and about their disposition in sequence.

12. Optical wavelength selective filter as claimed in claim 11, wherein said second half of the structure is symmetric with respect to said first half.

13. Optical wavelength selective filter as claimed in claim 1, wherein in said reflective couples the sum of the width of said zone with low refractive index and the width of said zone with high refractive index is substantially an even multiple of a quarter of the central wavelength of said second predetermined band (SB').

14. Optical wavelength selective filter as claimed in claim 1, wherein in said transmissive couples the sum of the width of said zone with low refractive index and the width of said zone with high refractive index is substantially an odd multiple of a quarter of the central wavelength of said first predetermined band (PB').

15. Optical multi/demultiplexer device, comprising:
a substrate;
a plurality of waveguides on said substrate; and
at least one wavelength selective filter according to any of claims 1 to 14, realized on one of said plurality of waveguides.

16. Optical multi/demultiplexer device as claimed in claim 15, wherein, at least one of said plurality of waveguides comprises a ridge.

17. Optical multi/demultiplexer device as claimed in claim 15, wherein said substrate is a semiconductor substrate.

18. Method for realizing an optical wavelength selective filter on a substrate comprising the following steps:
providing a waveguide in a optical transmissive material on said substrate;

forming in said waveguide a plurality of transmissive couples providing a first predetermined transmission wavelength band and a plurality of reflective couples providing a second predetermined reflection wavelength band disposed in series to each other, each transmissive couple and each reflective couple being provided with a first zone with a high refractive index and a second zone with a low refractive index adjacent to each other in a way to form a structure with modulated refractive index; and characterized in that it further comprises the step of providing the structure with at least a first and a second transmissive couple in the direction of propagation of the light in which the width of the zone with high refractive index of the second transmissive couple is higher than the width of the zone with high refractive index of the first transmissive couple.

19. Optical wavelength selective filter realized on an optical waveguide, said filter being able to transmit a first predetermined band of wavelengths (PB') and to reflect a second predetermined band (SB') and comprising a plurality of transmissive couples providing said first predetermined band and a plurality of reflective couples providing said second predetermined band disposed in series to each other, each transmissive couple and each reflective couple comprising a first zone with a high refractive index and a second zone with a low refractive index adjacent to each other in a way to form a structure with modulated refractive index, the structure comprising a first substructure and a second substructure in the direction of propagation of the light, wherein the first substructure comprises at least a first and a second transmissive couple in the direction of propagation of the light, the width of the zone with high refractive index of the second transmissive couple being higher than the width of the zone with high refractive index of the first transmissive couple.

* * * * *

UNITED STATES PATENT AND TRADEMARK OFFICE
CERTIFICATE OF CORRECTION

| | | |
|---|---|---|
| PATENT NO. | : 7,123,789 B2 | Page 1 of 1 |
| APPLICATION NO. | : 10/493570 | |
| DATED | : October 17, 2006 | |
| INVENTOR(S) | : Giacomo Gorni et al. | |

It is certified that error appears in the above-identified patent and that said Letters Patent is hereby corrected as shown below:

Claim 6, column 14, line 52, "sub structures" should read --substructure,--.

Claim 7, column 14, line 57, "substructure:" should read --substructure,--.

Signed and Sealed this

Twentieth Day of March, 2007

JON W. DUDAS
*Director of the United States Patent and Trademark Office*